US006856595B1

United States Patent
Brown (10) Patent No.: US 6,856,595 B1
(45) Date of Patent: Feb. 15, 2005

(54) METHOD AND APPARATUS FOR PROVIDING INPUT BACK PRESSURE IN AN OUTPUT BUFFERED SWITCH

(75) Inventor: David A. Brown, Carp (CA)

(73) Assignee: MOSAID Technologies, Inc., Kanata (CA)

( * ) Notice: Subject to any disclaimer, the term of this patent is extended or adjusted under 35 U.S.C. 154(b) by 0 days.

(21) Appl. No.: 09/574,621

(22) Filed: May 19, 2000

(51) Int. Cl.[7] .......................... G06F 11/00; H04L 12/56
(52) U.S. Cl. ...................... 370/229; 370/235; 370/252; 370/412
(58) Field of Search ................................. 370/229, 230, 370/232, 235, 250, 338, 390, 412, 413, 419, 428, 252, 253, 355, 386, 388, 389, 392, 395.1, 398, 231

(56) References Cited

U.S. PATENT DOCUMENTS

| 5,335,224 A | * | 8/1994 | Cole et al. .................. 370/235 |
| 5,475,682 A | * | 12/1995 | Choudhury et al. ........ 370/229 |
| 5,493,566 A | * | 2/1996 | Ljungberg et al. .......... 370/231 |
| 5,689,500 A | * | 11/1997 | Chiussi et al. .............. 370/235 |
| 5,689,506 A | * | 11/1997 | Chiussi et al. .............. 370/388 |
| 5,838,922 A | | 11/1998 | Galand et al. .............. 395/200 |
| 5,859,837 A | | 1/1999 | Crayford .................... 370/230 |
| 6,165,021 A | * | 12/2000 | Bourne ....................... 439/630 |
| 6,285,679 B1 | | 9/2001 | Dally et al. |

FOREIGN PATENT DOCUMENTS

| EP | 0 748 087 A | 12/1996 |
| EP | 0 785 699 A2 | 7/1997 |
| EP | 0 828 403 A1 | 3/1998 |
| GB | 2 343 344 A | 5/2000 |

* cited by examiner

Primary Examiner—Afsar Qureshi
(74) Attorney, Agent, or Firm—Hamilton, Brook, Smith & Reynolds, P.C.

(57) ABSTRACT

A switch applies back pressure to an ingress port while an output queue is congested. The switch includes an output queue associated with an egress port in the switch. The output queue stores packet pointers to data to be transmitted to the egress port. A back pressure controller in the switch applies back pressure to an ingress port while the output queue is congested upon receiving data at the ingress port to be transmitted to the egress port.

20 Claims, 6 Drawing Sheets

METHOD AND APPARATUS FOR PROVIDING INPUT BACK PRESSURE IN AN OUTPUT BUFFERED SWITCH

BACKGROUND OF THE INVENTION

A networking switch receives data packets from a number of ingress ports connected to the switch and forwards the data packets to one or more egress ports connected to the switch. The switch determines the egress port to which the data packets are forwarded dependent on a destination address and other fields included in the data packet.

Before being forwarded, the received data packet is queued in the switch. A data packet may be queued dependent on the ingress port at which it was received or the egress port at which it is to be transmitted. An input buffered switch queues a data packet dependent on the ingress port at which the data packet is received. An output buffered switch queues a data packet dependent on the egress port at which it is to be transmitted. An output buffered switch is non-blocking and there is no need to schedule a cross bar switch.

The speed at which data packets are received may be greater than the speed at which received data packets are transmitted from the switch. Thus, an input buffered switch monitors the number of data packets stored in the ingress port queue. Upon storing a predetermined congestion threshold number of data packets, back pressure is applied to the ingress port to reduce the number of data packets received by the ingress port.

In an Ethernet switch back pressure is applied using standard link level protocols. In a half duplex Ethernet implementation Ethernet back pressure link protocols include causing collisions using Carrier Sense Multiple Access with Collision Detect ("CSMA/CD") and carrier extension by forwarding "idle" packets. In a full duplex Ethernet implementation, Ethernet back pressure link protocols include sending a special control packet such as pause frames; that is, returning a command to the source of the data packets requesting that the source not send any data packets for a number of time slots.

However, in an output buffered switch, the queuing of data packets is not dependent on the ingress port at which the data packet is received. Thus, in output buffered switches back pressure is either not implemented, or back pressure is applied to all ingress ports in the output buffered switch.

If back pressure is not implemented, data packets received at an ingress port for a congested egress port, are dropped if they can not be stored in the output queue for the egress port. If back pressure is applied to all ingress ports in the switch, one congested egress port in the switch stalls the receipt of data packets received at all ingress ports in the switch and thus reduces data throughput.

SUMMARY OF THE INVENTION

A switch which applies back pressure to an ingress port while an output queue is congested is presented. The switch includes an output queue associated with an egress port in the switch. The output queue stores packet pointers to data to be transmitted to the egress port. A back pressure controller in the switch applies back pressure to an ingress port while the output queue is congested upon receiving data at the ingress port to be transmitted to the egress port.

The back pressure controller includes an ingress port state table associated with the ingress port. The ingress port state table includes a respective output port field for each port in the switch. The output port field indicates whether back pressure is to be applied to the ingress port upon receiving data to be transmitted to the egress port. The back pressure controller sets the output port field to congested if the output queue is congested and data is received by the ingress port for the egress port associated with the congested output queue.

The back pressure controller also includes a global output port congestion status register. The global output port congestion status register stores congestion status for the output queue.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

in FIG. 3.

DETAILED DESCRIPTION OF THE INVENTION

A description of preferred embodiments of the invention follows.

Figure 1:
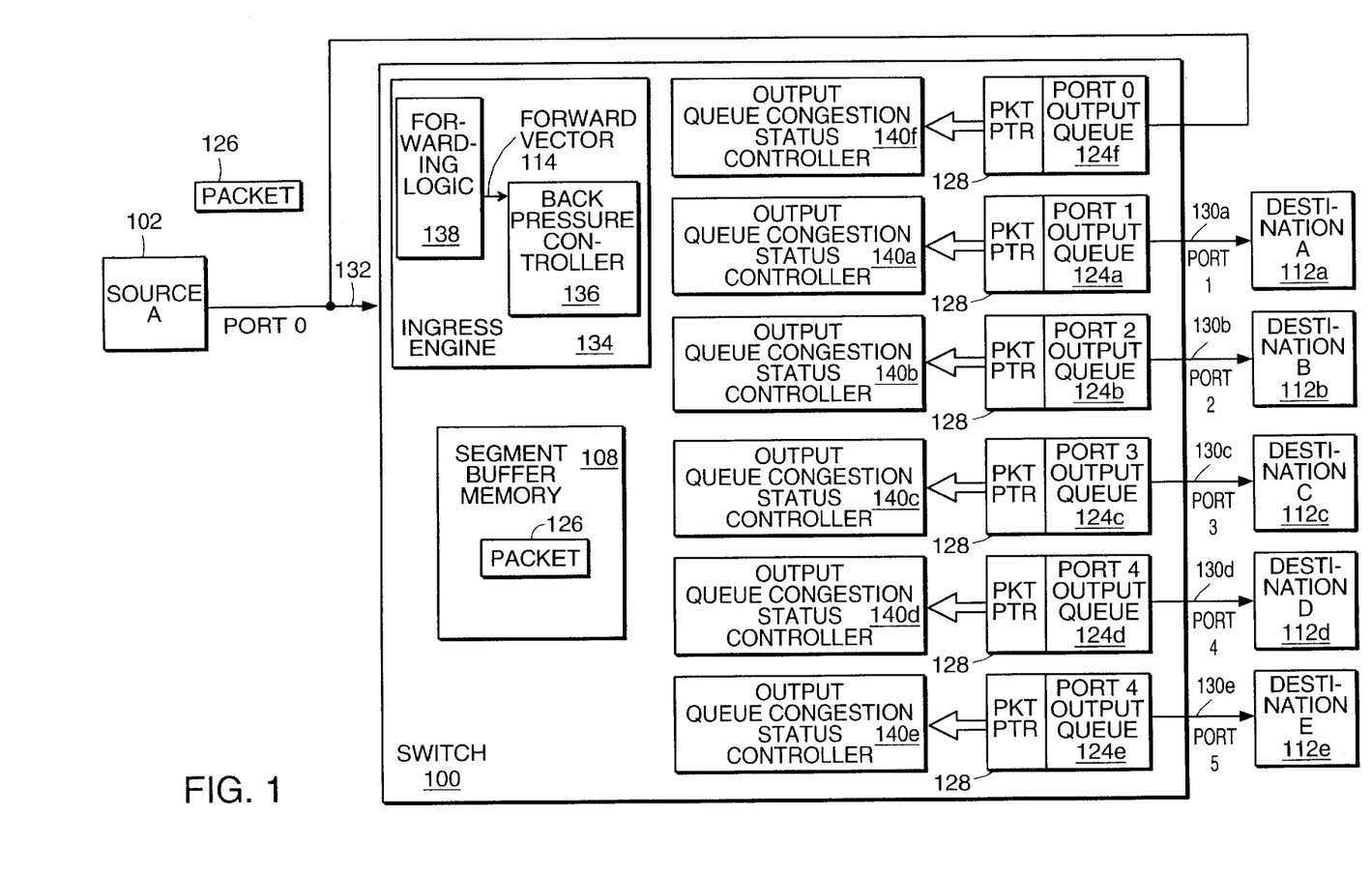
FIG. 1 is a block diagram of an output buffered switch according to the principles of the present invention.

FIG. 1 is a block diagram of an output buffered switch 100 according to the principles of the present invention. The output buffered switch 100 as shown includes six ports 132, 130a–e. Each port 132, 130a–e may transmit and receive data packets. Port 132 is referred to as an ingress port 132 and ports 130a–e are referred to as egress ports 130a–e in order to describe the invention. However, ingress port 132 is not limited to receiving data packets 126; ingress port 132 may also transmit data packets. And egress ports 130a–e are not limited to transmitting data packets 126; egress ports 130a–e may also receive data packets. The output buffered switch 100 is not limited to six ports 132, 130a–e as shown. The output buffered switch 100 may include more than six ports 132, 130a–e.

A source node 102 and destination nodes 112a–e are shown connected to the output buffered switch 100. A data packet 126 received by the output buffered switch 100 at an ingress port 132 from source node 102 is forwarded through egress ports 130a–e to one or more destination nodes 112a–e dependent on a destination address encoded in a header included in the data packet 126.

If the received data packet 126 is a broadcast data packet, the data packet 126 is forwarded to all destination nodes 112*a–e*. If the received data packet 126 is an IP Multicast data packet, the data packet 126 is forwarded to all members of the IP Multicast group which may include one or more of destination nodes 112*a–e*.

The output buffered switch 100 includes a respective output queue 124*a–e* for each egress port 130*a–e* and an output queue 124*f* for ingress port 132. Each of the output queues 124*a–f* has a respective output queue congestion status controller 140*a–f*. The output queue congestion status controller 140*a–f* is described later in conjunction with FIG. 2.

A data packet 126 received at ingress port 132 is stored in segment buffer memory 108. A packet pointer 128 is stored in one or more of output queues 124*a–f* dependent on whether the data packet 126 is to be transmitted from the respective egress port 130*a–e* to a destination node 112*a–e*. The output queue 124*a–f* in which a packet pointer 128 is stored is selected by a forward vector 114 forwarded from the forwarding logic 130. The forward vector 114 is dependent on the contents of a header included in the data packet 126. A packet pointer 128 is the start address of the location of the data packet 126 in segment buffer memory 108.

The output queue 124*a–f* can be implemented as a First In First Out ("FIFO"), a linked list, a queue as described in co-pending U.S. patent application Ser. No. 09/559,190 filed on Apr. 27, 2000 entitled "Port Packet Queuing" by Richard M. Wyatt incorporated herein by reference in its entirety or any other type of queue well-known in the art.

The packet pointer 128 for a received data packet 126 may be enqueued in a machine cycle in more than one output queue 124*a–f*. However, in order to forward the data packet 126 to the egress port 130*a–e*, the packet pointer 128 is dequeued from only one of the output queues 124*a–f* in each machine cycle. Thus, the packet pointer 128 may be enqueued on an output queue 124*a–f* faster than it is dequeued from the output queue 124*a–e*, which may result in a congested output queue 124*a–e* as multiple sources 102 enqueue data packets in an output queue 124*a–e*.

A data packet 126 received at an ingress port 132 may be forwarded to any egress port 130*a–e* in the output buffered switch 100. In the case of a received broadcast data packet, the data packet 126 may be forwarded to every egress port 130*a–e* in the switch 100.

Upon receiving a data packet 126 at ingress port 132, the forwarding logic 130 in the ingress engine 134 generates a forward vector 114 dependent on headers included in the data packet 126. The forward vector 114 is used to select the egress ports 130*a–e* to which the data packet 126 is to be forwarded. Generation of a forward vector is described in co-pending U.S. patent application Ser. No. 09/453,344 filed Dec. 1, 1999 entitled "Method and Apparatus for Wire-Speed IP Multicast Forwarding" by David A. Brown, incorporated herein by reference in its entirety.

The back pressure controller 136 in the ingress engine 134 stores congestion status for each of the output queues 124*a–f*. The back pressure controller 136 determines from the queue's congested status whether any of the output queues 124*a–e* selected by the forward vector 114 are congested.

If any of the output queues 124*a–f* selected by the forward vector 114 are congested, the back pressure controller 136 applies back pressure to the ingress port 132 at which the data packet 126 was received. The output buffered switch 100 stores the data packet 126 in segment buffer memory 108. Next, the output buffered switch 100 enqueues a packet pointer 128 to the packet in segment buffer memory 108 to all output queues 124*a–e* selected by the forward vector 114. Packet pointer generation is described in co-pending U.S. patent application Ser. No. 09/386,589 filed on Aug. 31, 1999 entitled "Method and Apparatus for an Interleaved Non-Blocking Packet Buffer" by David A. Brown which is incorporated herein by reference in its entirety.

Figure 2:
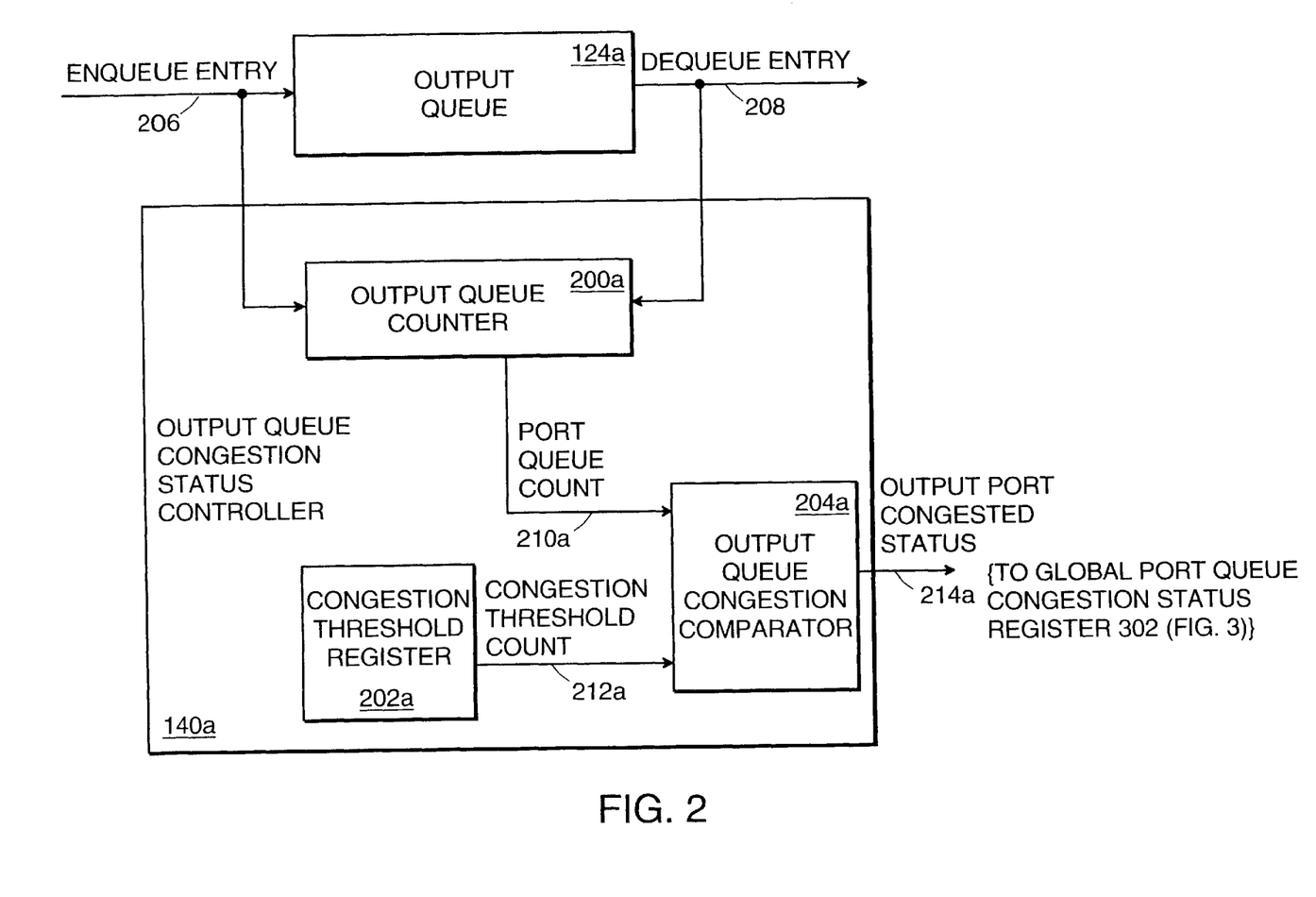
FIG. 2 is a block diagram illustrating an output queue congestion status controller for any one of the output queues shown in FIG. 1.

FIG. 2 is a block diagram illustrating output queue congestion status controller 140*a* and output queue 124*a* shown in FIG. 1. The output queue congestion status controller 140*a* includes an output queue counter 200*a*, an output queue congestion comparator 204*a* and a congestion threshold register 202*a*.

The output queue counter 200*a* stores a port queue count 210*a*. The port queue count 210*a* is the number of packet pointers 128 stored in the output queue 124*a*. The output queue counter 200*a* is incremented each time a packet pointer 128 is enqueued in the output queue 124*a* through enqueue entry 206. The output queue counter 200*a* is decremented each time a packet pointer 128 is dequeued from the output queue 124*a* through dequeue entry 208. If the port queue count 210*a* is '0', there are no packet pointers stored in the output queue counter 200*a* associated with egress port 130*a*.

The congestion threshold register 202*a* stores a congestion threshold count 212*a*. The congestion threshold count 212*a* is the number of packet pointers 128 at which the output queue 124*a* is congested. The congestion threshold count 212*a* may be programmed by policy of an operator or a network administrator.

The output queue congestion comparator 204*a* compares the congestion threshold count 212*a* and the port queue count 210*a* to determine if the output queue 124*a* is congested. If the port queue count 210*a* is greater than or equal to the congestion threshold count 212*a*, output port congested status 214*a* is set to "congested". If the port queue count 210*a* is less than the congestion threshold count 212*a*, output port congested status 214*a* is set to "not congested". Thus, the state of output port congested status 214*a* is dependent on the number of packet pointers 128 stored in the output queue 124*a*. The steps implemented in the output queue congestion status controller 140*a* for determining if the output queue 124*a* is congested are described in conjunction with FIG. 5.

Figure 3:
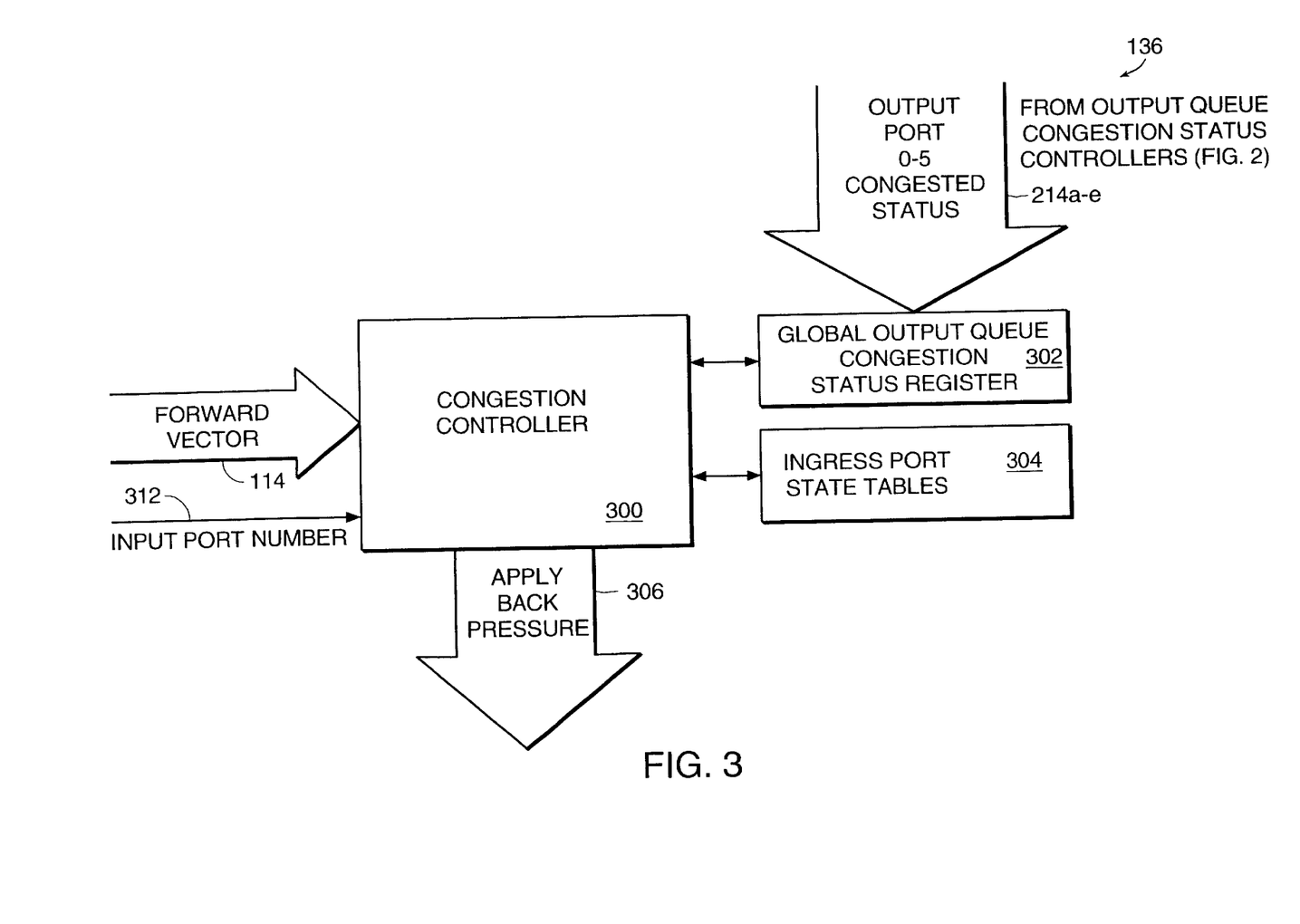
FIG. 3 is a block diagram illustrating a back pressure controller for applying back pressure to an ingress port.

FIG. 3 is a block diagram illustrating the back pressure controller 136 shown in FIG. 1. The back pressure controller 136 includes a congestion controller 300, a global output queue congestion status register 302 and ingress port state tables 304.

The global output queue congestion status register 302 stores output port congested status 214*a–f* forwarded from the respective output queue congestion status controller 216 for each of the output queues 124*a–f*. The state of output port congested status 214*a–f* indicates whether the respective output queue 124*a–f* is congested. The ingress port state tables 304 include a respective ingress port state table 304*a* f for each port 132, 130*a–e* in the output buffered switch 100.

As a data packet 126 (FIG. 1) is received at an ingress port 132 (FIG. 1), the forward vector 114 generated by the forwarding logic 130 (FIG. 1) and the ingress port number 312 for the ingress port 132 are forwarded to the congestion controller 300. The congestion controller 300 determines if any of the egress ports 130*a–f* selected in the forward vector 114 are congested by examining output port congested status 214*a–f* stored in the global output queue congestion status register 302. If an output port congested status 214*a–f* for a port selected by the forward vector 114 is set to "congested", the congestion controller 300 forwards apply back pressure 306 to the ingress port 132 (FIG. 1) associated with the input port number 312. Back pressure is applied to the ingress port 132 (FIG. 1).

Figure 4:
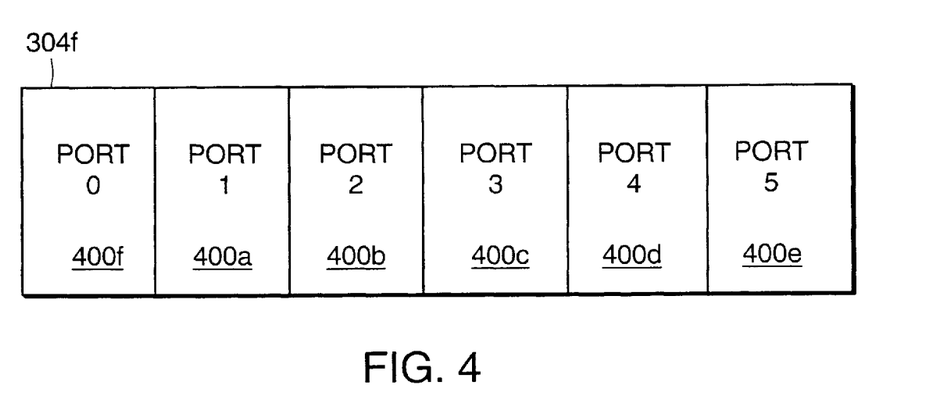
FIG. 4 is a block diagram of one of the ingress port state tables shown.

FIG. 4 is a block diagram of an ingress port state table 304f for an ingress port 132. The ingress port state table 304f includes a port field 400a–f for each output queue 124a–f in the output buffered switch 100. Each port field 400a–f may be implemented as a single bit or may include more than one bit. The state of the port field 400a–f indicates whether congestion has been detected on the respective output queue 124a–f in the output buffered switch 100. Congestion in an output queue 124a–f is detected by the output queue congestion status controller 140a which has already been described in conjunction with FIG. 3. For example, if a data packet 126 to be forwarded to egress port 130c is received on ingress port 132 while output port congested status 214c is set to "congested" in the global output queue congestion status register 302(FIG. 3), port field 400c is set to "congested" in ingress port state table 304f.

Returning to FIG. 3, while an output queue 124a–f is congested, a subsequent data packet arriving from another ingress port in the output buffered switch 100 will set the respective port field 400a–f corresponding to the congested output queue 124a–f in the respective ingress port state table 304a–f.

The congestion controller 300 determines whether to apply back pressure to an ingress port 132 through apply back pressure 306 dependent on the state of the port fields 400a–f in the port state table 304a–f associated with the ingress port 132 at which the data packet 126 was received. Thus, as a data packet 126 arrives at an ingress port 132 in the output buffered switch 100, back pressure is applied to the ingress port 132 if the egress port 130a–e is selected by the forward vector 114 and the port field 400a–f for the selected egress port 130a–e in the ingress port state table 304 for the ingress port 132 is set to "congested".

In a half-duplex Ethernet implementation, back pressure may be applied by causing collisions using Carrier Sense Multiple Access with Collision Detect ("CSMA/CD") or by forwarding "idle" packets. Back pressure is applied until the output port queue 124a–f is no longer "congested"; that is, it is under the congestion threshold. In a full-duplex Ethernet implementation back pressure may be applied using pause frames; that is, returning a command to the source of the data packets requesting that the source not send any data packets for a number of time slots. After the requested number of time slots, the source 102 connected to the ingress port 132 at which back pressure was applied may retransmit the data packet to the ingress port 132.

Thus, each ingress port 132 keeps track of data packets that cause an output queue 124a–f to pass a congestion threshold or accumulate in the congestion threshold. The ingress port 132 that causes an output queue 124a–f to reach the congestion threshold is back pressured. When the number of packet pointers 128 stored in the output queue 124a–f decreases, the back pressure is released at the ingress port 132. An ingress port 132 may have caused more than one output queue 124a–f to reach the congestion threshold. Thus, all the output queues 124a–f in which the ingress port 132 caused to pass a congestion threshold or accumulate in the congestion threshold must be under the congestion threshold before back pressure is no longer applied to the ingress port. The steps for determining whether to apply back pressure are described in conjunction with FIG. 6.

Figure 5:
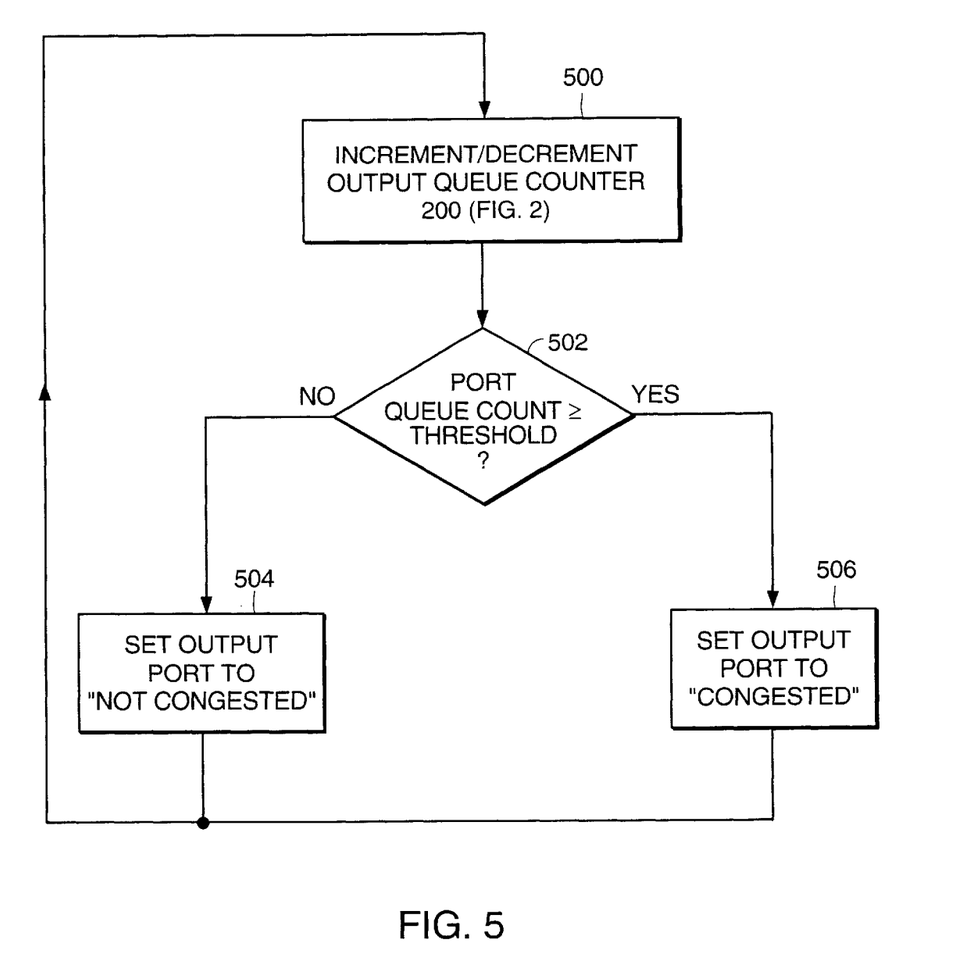
FIG. 5 is a flow chart of the steps implemented in the output queue congestion status controller shown in FIG. 2 for determining if the output queue is congested.

FIG. 5 is a flowchart of the steps implemented in the output queue congestion status controller 140a shown in FIG. 2 for determining if the output queue 124a is congested. FIG. 5 is described in conjunction with FIG. 2.

At step 500, the output queue counter 200a is decremented as a packet pointer 128 (FIG. 1) is dequeued from the output queue 124a and incremented as a packet pointer 128 (FIG. 1) is enqueued on the output queue 124a. Processing continues with step 502.

At step 502, the output queue congestion comparator 204a compares the port queue count 210a from the output queue counter 200a with the congestion threshold count 212a stored in the congestion threshold register 202a. If the port queue count 210a is greater than or equal to the congestion threshold count 212a, processing continues with step 506. If the port queue count 210a is less than the congestion threshold count 212a, processing continues with step 504.

At step 504, the output queue congestion comparator 204a sets output port congested status 214a to "not congested". Output port congested status 214a is stored in the global output queue congestion status register 302 (FIG. 3). Processing continues with step 500.

At step 506, the output queue congestion comparator 204a sets output port congested status 214a to "congested". Processing continues with step 500.

Figure 6:
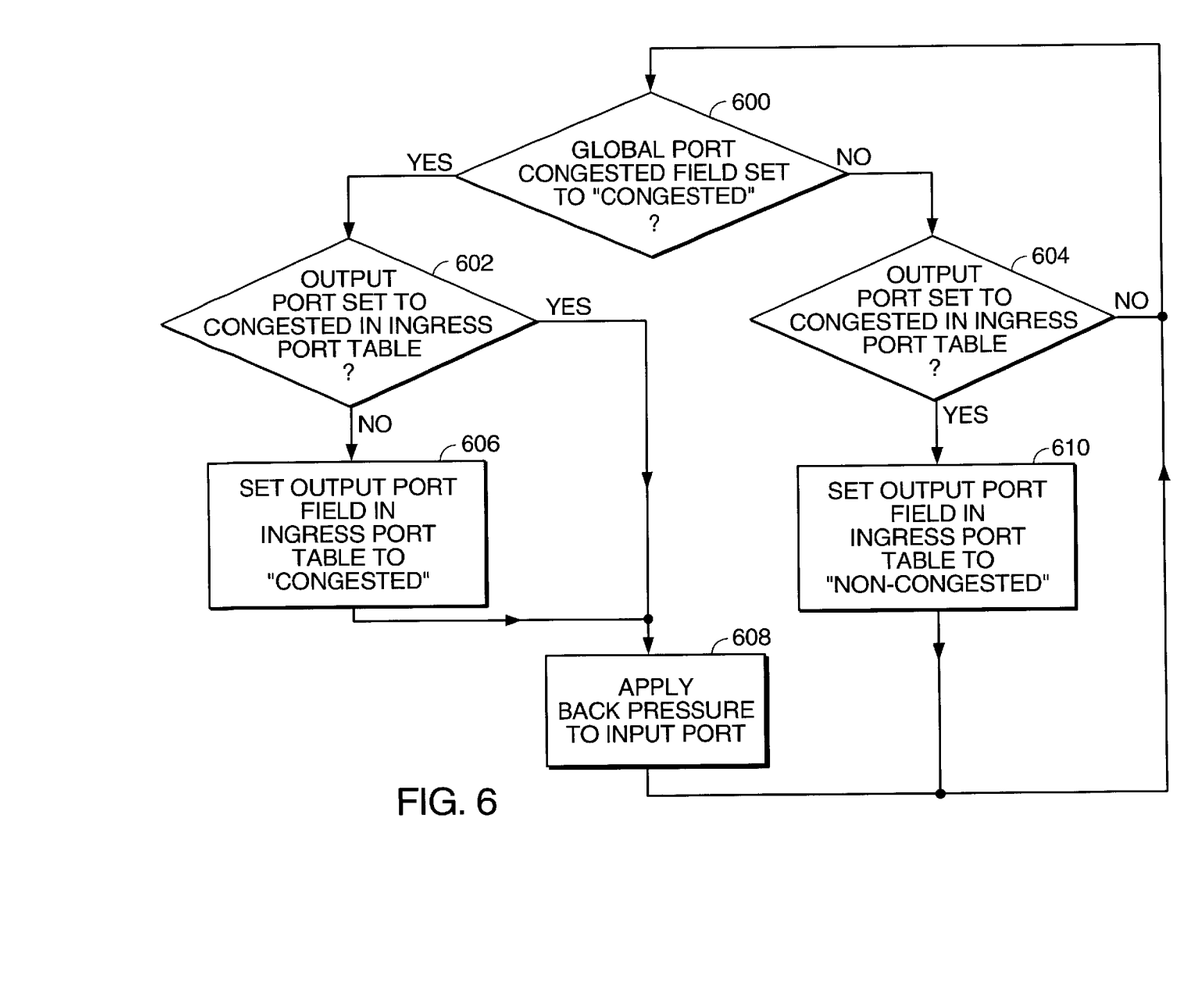
FIG. 6 is a flow chart of the steps implemented in the back pressure controller shown in FIG. 3 for applying back pressure to an ingress port if a data packet to be forwarded to a congested egress port is received at the ingress port.

FIG. 6 is a flowchart of the steps implemented in the back pressure controller 136 shown in FIG. 3 for determining when to apply back pressure to the ingress port 132.

FIG. 6 is described in conjunction with FIGS. 1 and 3.

At step 600, upon receiving a data packet 126 at an ingress port 132 in the output buffered switch 100, the ingress port number 312 and the forward vector 114 are forwarded to the congestion controller 300 in the back pressure controller 136. The ingress port number 312 is the port number in the output buffered switch 100, at which the data packet 126 was received. The forward vector 114 selects one or more egress ports 130a–e to which the data packet 126 is to be forwarded. The forward vector 114 is generated by the forwarding logic 138 (FIG. 1) dependent on the contents of headers included in the received data packet 126.

The congestion controller 300 examines the contents of the global output queue congestion status register 302 before the packet pointer 128 is enqueued in one or more output queues 124a–f. The congestion controller 300 determines whether any of the output queues 124a–f selected by the forward vector 114 are congested. To determine whether an output queue 124a–f selected by the forward vector 114 (FIG. 1) is congested, the congestion controller 300 examines the respective output port congested status 214a–f stored in the global output queue congestion status register 302 (FIG. 3).

If output port congested status 214a–f in the global output queue congestion status register 302 is set to "congested" for any port selected by the forward vector 114, processing continues with step 602. If not, processing continues with step 604.

At step 602, the output queue 124a–f in which the packet pointer 128 is to be enqueued is congested. The congestion controller 300 examines the output queue fields 400a–f in the ingress port state table 304 corresponding to the ingress port number 312 at which the data packet 126 was received. If the output queue field 400a–f corresponding to the output queue 124a–f in which the packet pointer 128 is to be enqueued is set to "congested" indicating that the congestion was already detected by the ingress port 132 at which the data packet 126 was received, processing continues with step 608. If not, the congestion of the output queue 124*a–f* was detected by a data packet 126 received at another ingress port and processing continues with step 606.

At step 604, the congestion controller 300 examines the ingress port state table 304 corresponding to the ingress port number 312 at which the data packet 126 was received. If any output port field 400*a–f* corresponding to an egress port 130*a–e* selected by the forward vector 114 is set to "congested" in the ingress port state table 304, processing continues with step 610. If not, processing continues with step 600.

At step 606, the congestion controller 300 sets the output port field 400*a–f* in the ingress port state table 304 corresponding to the ingress port number 312 at which the data packet 126 was received to "congested". Processing continues with step 608.

At step 608, back pressure is applied to the ingress port 132 at which the data packet 126 was received. Processing continues with step 600.

At step 610 there is no congestion in any of the egress ports 130*a–e* selected by the forward vector 114 for the data packet 126 received at the ingress port 132. Thus, the congestion controller 300 sets the output port field 400*a–f* for the egress ports 130*a–e* selected by the forward vector 114, in the ingress port state table 304 associated with the ingress port number 312 at which the data packet was received to "not congested". Processing continues with step 600.

Thus, back pressure is only applied to an ingress port 132 upon receiving a data packet 126 to be forwarded to a congested egress port 130*a–e* while the egress port 130*a–e* is congested. Upon receiving a data packet 126 from any source connected to ingress port 132 to be forwarded to a congested egress port 130*a–e*, back pressure is applied to the ingress port 132 and thus to all nodes connected to the ingress port 132.

While this invention has been particularly shown and described with references to preferred embodiments thereof, it will be understood by those skilled in the art that various changes in form and details may be made therein without departing from the scope of the invention encompassed by the appended claims.

What is claimed is:

1. An output buffered switch comprising:
   memory storing data received at an ingress port from a source node coupled to the switch;
   an output queue associated with an egress port in the switch, the output queue storing packet pointers to the data stored in the memory to be transmitted to the egress port; and
   a back pressure controller which upon receiving data at the ingress port to be transmitted to the egress port, applies back pressure to the ingress port to apply back pressure to the source node while the output queue is congested.

2. A switch as claimed in claim 1 wherein the back pressure controller further comprises:
   an ingress port state table associated with an ingress port, the ingress port state table including a respective output port field for each port in the switch, the output port field indicating whether to apply back pressure to the ingress port upon receiving data to be transmitted to the egress port.

3. A switch as claimed in claim 2 wherein the back pressure controller sets the output port field to congested if the output queue is congested and data is received by the ingress port for the egress port associated with the congested output queue.

4. A switch as claimed in claim 1 wherein the back pressure controller further comprises:
   a global output port congestion status register which stores congestion status for the output queue.

5. A switch as claimed in claim 1 wherein the back pressure controller further comprises:
   an output queue congestion status controller which determines the status of the output queue dependent on the result of comparing an accumulated output queue count with a threshold count.

6. An output buffered switch comprising:
   memory storing data received at an ingress port from a source node coupled to the switch;
   an output queue associated with an egress port in the switch, the output queue storing packet pointers to the data stored in the memory to be transmitted to the egress port; and
   means for applying back pressure to an ingress port to apply back pressure to the source node while the output queue is congested upon receiving data at the ingress port from the source node to be transmitted to the egress port.

7. A switch as claimed in claim 6 wherein means for applying back pressure further comprises:
   an ingress port state table associated with an ingress port, the ingress port state table including a respective output port field for each port in the switch, the output port field indicating whether to apply back pressure to the ingress port upon receiving data to be transmitted to the egress port.

8. A switch as claimed in claim 7 wherein the means for applying back pressure sets the output port field to congested if the output queue is congested and data is received by the ingress port for the egress port associated with the congested output queue.

9. A switch as claimed in claim 6 wherein the means for applying back pressure further comprises:
   a global output port congestion status register which stores congestion status for the output queue.

10. A switch as claimed in claim 6 wherein the means for applying back pressure further comprising:
    means for determining status of the output queue by comparing an accumulated output queue count with a threshold count.

11. A method for controlling congestion in an output buffered switch comprising the steps of:
    storing data received at an ingress port from a source node in a memory, the source node coupled to the switch;
    providing an output queue associated with an egress port in the switch, the queue storing packet pointers to the data stored in the memory to be transmitted to the egress port; and
    applying back pressure to an ingress port to apply back pressure to the source node while the output queue is congested upon receiving data at the ingress port from the source node to be transmitted to the egress port.

12. A method as claimed in claim 11 wherein the step of applying back pressure further comprises the steps of:
    providing an ingress port state table associated with an ingress port, the ingress port state table including a respective output port field for each port in the switch; and determining whether to apply back pressure to the ingress port upon receiving data to be transmitted to the egress port dependent on the state of the output port field.

13. A method as claimed in claim 12 wherein the step of applying back pressure further comprises the step of:

setting the output port field to congested if the output queue is congested and data is received by the ingress port for the egress port associated with the congested output queue.

14. A method as claimed in claim 11 wherein the step of applying back pressure further comprises the steps of:

providing a global output port congestion status register; and storing congestion status for the output queue in the global output port congestion status register.

15. A method as claimed in claim 11 wherein the step of applying back pressure further comprises the steps of:

comparing an accumulated output queue count with a threshold count; and determining the status of the output queue dependent on the result of the: comparison.

16. The switch of claim 1, wherein back pressure is applied to the source node using an Ethernet link level protocol.

17. The switch of claim 16, wherein the Ethernet link level protocol sends pause frames to the source node.

18. The switch of claim 16, wherein the Ethernet link level protocol sends idle packets to the source node.

19. The switch of claim 1, further comprising:

forwarding logic which selects the output queue corresponding to the egress port selected in the received data for storing the packet pointer to the stored data.

20. The method of claim 11, wherein back pressure is applied to the source node using an Ethernet link level protocol.

* * * * *